United States Patent [19]

Biegelmeier

[11] Patent Number: 5,371,646

[45] Date of Patent: Dec. 6, 1994

[54] GROUND FAULT CIRCUIT INTERRUPTER

[75] Inventor: Gottfried Biegelmeier, Vienna, Austria

[73] Assignee: Felten & Guilleaume Austria AG, Schrems-Eugenia, Austria

[21] Appl. No.: 821,621

[22] Filed: Jan. 16, 1992

[30] Foreign Application Priority Data

Jan. 16, 1991 [AT] Austria ..................................... 80/91
Feb. 4, 1991 [AT] Austria ..................................... 232/91
May 29, 1991 [AT] Austria ................................. 1090/91

[51] Int. Cl.$^5$ ............................................... H02H 3/16
[52] U.S. Cl. ......................................... 361/47; 361/45
[58] Field of Search ..................... 361/44, 49, 46, 47, 361/48, 49, 50, 71, 74, 75

[56] References Cited

U.S. PATENT DOCUMENTS

4,347,540  8/1982  Gary et al. .......................... 361/47
4,428,021  1/1984  Chen et al. .......................... 361/47
5,019,935  5/1991  Nakamura ........................... 361/49

Primary Examiner—Todd DeBoer
Attorney, Agent, or Firm—Young & Thompson

[57] ABSTRACT

A fault current circuit breaker has a summary current transformer whose secondary coil is connected to a voltage-independent energy storage circuit. A monostable or bistable transformer relay is actuated by an impulse by way of this energy storage circuit when a fault current flows to earth in the protected installation. When the relay contact is made, an electromagnetic lock trigger is actuated by the energizing current received from the mains supply, which triggers the switch lock of the FC switch. After this, the bistable transformer relay is returned to its initial position, either mechanically by way of an appropriate coupling with the switch lock, or electrically by way of a time delay or switch circuit, whereby the relay contact opens and the FC switch is again ready for switching on. With the monostable transformer relay, the relay returns to its initial position automatically, whereby the energy storage circuit is adjusted to the coil of the relay such that the duration of the impulse delivered by the energy storage circuit is sufficiently long for the lock trigger to be actuated by the energizing current from the mains supply.

13 Claims, 10 Drawing Sheets

GROUND FAULT CIRCUIT INTERRUPTER

FIELD OF THE INVENTION

The present invention relates to a ground fault circuit interrupter (hereinafter abbreviated to FC switch), comprising a housing having terminals for supply mains, accommodating contact apparatus with associated switch lock, test equipment, actuating element, electromagnetic operating current trigger for the switch lock (lock trigger), summary current transformer, electronic energy storage circuit and electronic or electromechanical relay with associated contact maker (transformer relay), whereby the secondary winding of the summary current transformer actuates the mains voltage-independent electronic energy storage circuit and actuates the energy storage circuit of the transformer relay when a preset limit of the trigger fault current is exceeded.

The motivation behind the present invention was to increase the dependability of the FC, switches available on today's market, so as to make their release as reliable as those in automatic cutouts (AC).

BACKGROUND OF THE INVENTION

In recent years, a series of installation inspections has shown that FC switches currently fall short of the requirements necessarily placed on the dependability of the cutout in a circuit breaker in the event of a fault. (Biegelmeier, G. and Kieback, Dr. The Problem of Dependability in Fault Current Circuitry, Bulletin of the International Section of the IVSS for Prevention of Accidents in the Workplace and Occupational Diseases through Electricity, issue 11, 1990).

Nowadays an average failure of several per cent must be reckoned with when examining the operability of FC switches with an installation life of up to ten years, whereby closer breakdown reveals that with an installation life of ten years or more even 10% of the switches do not work. Since there is a growing tendency for FC switches to be installed in millions of units per year, there is a problem to be addressed.

Cause of failure of FC switches lies in the construction principle used in FC switches currently on the market. They use either highly sensitive permanent magnetic triggers in order to save on material for the summary current transformer, as in EP-A-228 345, 351 674 and 293 702, or use electronic circuits with numerous components which are constantly connected to mains voltage and thus have only a limited life, as in EP-A-252 693, 152 043. They are not only exposed to excess voltage, but also consume electrical energy, since the power dissipated by this type of FC component is around one Watt (Solleder. R. Why Fault Current Circuit Breakers with voltage-independent Triggering? vol. 107 (1986), No. 20, pp. 938-945).

Voltage-independent power storage circuits can certainly actuate less sensitive permanent magnetic triggers, but require high-guard and interference-prone switch locks. This solution has been known for quite some time (AT-PS 197 468). It is described in modified form in DE-B-25 40 81 5 and CH-A-656 262.

The construction principle, in which permanent magnetic triggers are used for triggering the FC switches, leads to a dead-end when following the modern tendency of developing more and more highly sensitive triggers. The polished surfaces between trigger armature and yoke must be machined more and more precisely and have a tendency to exhibit a sticking phenomena, the causes of which are not yet clear and which might be found in microcrystalline solid mass formation. Highly developed cleaning processes in extremely clean rooms do improve dependability, but provide no real cure.

There is also the possibility of using an operating current trigger in place of a permanent magnetic trigger.

This type of trigger has been used with success for quite some time for electromagnetic quick breaking of automatic cutouts (AC). Even with the use of storage switches, the power of the summary current transformer is insufficient to actuate an operating current trigger. For this reason, voltage-independent electronic amplifying circuits were used hitherto, whose input is connected to the secondary winding of the summary current transformer and which actuate the operating current trigger mainly by means of thyristor circuits during flow of fault currents of corresponding strengths (see AT-B-378 444). As a result of electronic components in constant contact with the mains supply, this solution has the disadvantages mentioned above with respect to the dependability of the triggering after long installation periods.

SUMMARY OF THE INVENTION

The solution to the abovementioned exercise follows according to the present invention in that the transformer relay does not operate according to the holding magnet or locking magnet principle and actuates the switch lock by closing the associated relay contact of the lock trigger in a voltage-independent manner, whereby the ground fault circuit interrupter switches off and the transformer relay consequently returns to its starting position.

A solution to the problem is offered by the invention, in that the secondary winding of the summary current transformer is connected to a voltage-independent energy storage circuit, instead of the unreliable voltage-dependent electronic unit. With corresponding intensity of the fault current in the primary winding of the summary current transformer the energy storage circuit is loaded time-dependently and after the threshold voltage of a voltage-dependent electronic switch module is reached, it gives a switch impulse to a relay (hereinafter called transformer relay). This produces a contact in the transformer relay, whereby an electromagnetic operating current trigger (hereinafter abbreviated lock trigger) with high triggering power for releasing the switch lock receives the required energizing current from the mains and switches off the FC switch.

In a known manner the electric circuit for the lock relay and the test circuit can be separated from the outer conductor by a breaker contact in the contact apparatus. The transformer relay can be designed to be either monostable or bistable.

With such an electromechanical monostable transformer relay according to the present invention, the relay contact is made momentarily by the trigger impulse emanating from the energy storage circuit, whereby the electrical data of the energy storage circuit and the coil of the transformer relay are synchronized with each other such that the trigger impulse and thus the continuous duty of the relay contact are sufficiently long for the lock trigger to be actuated safely. Following this procedure the monostable transformer relay returns automatically to its original position.

In the energy storage circuit this requires a large condenser and thus relatively long charging times which may cause difficulties for the FC switches for the backup protection with a nominal fault current of 30 mA.

In an embodiment of the present invention the monostable transformer relay is accordingly held by an electrical circuit in the on-position of the contact maker long enough for the lock trigger to have actuated the switch lock and thus switched off the FC switch. The maintenance circuit is in contact with the mains supply on the receiving end, or is connected in the usual manner to the auxiliary contact which also supplies the test equipment with power. Its supporting effect begins when the contact maker of the transformer relay, which also lies in the maintenance circuit, as does the relay coil, is closed. This ensures that the contact time of the relay contact is sufficiently long for the lock trigger to be actuated.

Another embodiment of the FC switch according to the present invention occurs when an electronic relay is used instead of an electromechanical relay as the transformer relay.

This type of electronic relay may be a thyristor circuit which becomes conductive through the; impulse of the voltage-independent energy storage circuit (contact maker). In the event of a fault, a break may then occur in a semiconductor, though under the present operating conditions this is extremely improbable, and the failure rate of the thyristor circuit is less by at least a decimal power, than if a voltage-dependent electronic circuit were used for detecting the fault current signal, as in FIG. 8. The circuits with electronic relays are therefore less reliable than the embodiments according to the present invention with mechanical relays, but still more reliable by at least a decimal power than the FC switch constructions currently used having permanent magnetic triggers or voltage-dependent amplifying circuits.

If a bistable transformer relay were to be used, it must be reset to its original position after the impulse and the switching action induced thereby. According to the present invention, this may occur either electrically or mechanically, during which the relay contact is re-opened.

Mechanical resetting occurs according to the present invention in that, similarly to permanent magnetic triggers of conventional FC switch constructions, the bistable transformer relay is returned to its original position by a mechanical coupling during the switching off action of the switch lock.

Electric resetting can be carried out according to the present invention by an additional actuator coil of the transformer relay, which receives the energizing current from the mains by closing of the relay contact.

According to the present invention, this coil is connected to the mains supplies on the mains side by way of a suitable time delay circuit. This means that the mains end and receiving end must be taken into account when the FC switch is connected.

Electric resetting can be carried out also according to the present invention with the actuator coil of the transformer relay, which is connected to the energy storage circuit for the fault current release. The starting circuit is galvanically separated from the mains supplies, whereby the coil according to the present invention can be connected to a second electric circuit, in turn connected to the mains supplies. This electric circuit contains a suitable time delay circuit and the contact of the transformer relay.

It is easily understood why the embodiments according to the present invention of these FC switches have triggering dependability greater by far than the constructions currently available on the market. Both the lock trigger and the transformer relay have a considerable lifetime with the minimal switching frequency typical in a FC switch. The lock trigger can be constructed as robustly as the usual triggers of automatic cutouts, and the switch lock of the FC switch according to the present invention can correspond in principle to that of an automatic cutout. The transformer relay can be completely hermetically sealed when electrically reset, but with mechanical resetting the sticking phenomena of the permanent magnetic triggers used hitherto do not apply.

The electronic components of the voltage-independent energy storage circuit also have a considerable lifetime. When there is no fault current flowing, that is, the majority of the time, these components are in a voltageless state. Their dependability factors are accordingly high.

With the FC switches according to the present invention the goal is thus achieved of attaining a dependability in the triggering of the same magnitude as is usual with automatic cutouts The old objection that triggering depends on the mains voltage is just as inconclusive as the old reproach that zeroing is unreliable because of the neutral conductor interruptions.

At long last voltage-independent FC switches are permissible nowadays in most countries, at least for backup protection, although they work with electronics in constant contact with the full mains voltage and consequently have a limited lifetime.

In all of the embodiments of the present invention, high-voltage protection elements such as diodes or varistors can be installed in a known manner in the transformer circuit and in the lock trigger circuit.

The present invention further relates to an embodiment of the FC switch according to the present invention which enables a particularly economical solution for its overload protection and short circuit protection together with a pre-fuse whose rated amperage is above the rated current of the FC switch.

To date this problem has yet to be satisfactorily solved. FC switches are tested with respect to their heating only with the rated current. The overload protection devices, which in practice are installed on the mains side before the FC switches, have rated currents, which, because of the selectivity with the interposed overload protection devices for the output electric circuit, are for the most part higher than the rated current of the FC switch by two to three steps of rated current. An example of a common arrangement is the rated current 40 A for the FC switch and 63 A for the, interposed lead fuse. This arrangement is tested at the installation site normally in relation to the heat seal strength and short-circuit strength with high short-circuit currents, such as 6000 A, but not tested in relation to heating. Overload protection devices do not start to trigger until 1.45 times the rated current therefore, a 63 A lead fuse will switch off under favourable conditions when loaded with 90 A after about one hour, and under unfavourable conditions, such as good heat dissipation, even only at still higher currents. In the case of such loads however the FC switch becomes totally damaged after a short time and constitutes a considerable short-circuit and fire hazard. These loads may occur however during normal use when the normal operating currents of consumers on the installation site are high and if in the case of an unfavourable simultaneity factor they are above the rated current of the FC switch. This is possible without further ado, since the sum of the rated currents of the switched overload protection devices for the final electric circuits is for the main part essentially higher than the rated current of the FC switch. It is thus a requirement in many countries that the rated current of the overload protection device in front of the FC switch may not be higher than its rated current. Apart from the fact that this reduces the selectivity of the overload protection, this requirement is insufficient in protecting the FC switch from damage, as in this case also the 1.45 times rated current of the FC switch may flow for one hour or even longer and thus more than double the power dissipation in the switch is released than that with which the heating test was performed.

Examples of the abundance of solutions proposed to this problem are AT-B-220 695, 235 936, DE-B-1 188 706, FR-A-1 508 704 and DE-A-1 588 723.

DE-B-1 588 723, for example, describes a fault current circuit breaker with temperature monitoring consisting of a bimetal heat-sealed to the core of the summary current transformer Should the core overheat, the bimetal bends so far that contact of the test device of the FC switch present in any case is made, and the FC switch is thus switched off by means of the test device.

FR-A-1 508 704 describes a solution with a varistor arranged in the summary current transformer of the FC switch and supplied with current in the main electric circuits by way of a rectifier circuit and current transformer. When overloaded, the switch mechanism uncouples by means of a special coil in the fault current trigger and the FC switch switches off.

All solutions described have not been carried out in practice. They were either too expensive or too unreliable to protect the FC switch from damage during single-phase or double-phase overloads.

In comparison to this, the energy storage circuit, available in the FC switch with transformer relay as claimed in claim 1, is used according to the present invention to economically and effectively protect the FC switch against overloads, together with a resistor having negative temperature coefficients (NTC resistor, hereinafter abbreviated as varistor), which according to the state-of-the-art is disposed within the summary current transformer of the FC switch. With this solution, the interposed overload protection device takes over the short-circuit protection and protection against fusing, as previously.

So as to protect against overload in both single-phase and tripbase overloading, the varistor is heat-sealed in the summary current transformer with the surfaces of the outer conductor and neutral conductor primary coils. On one side it Is connected to a conductor of the main electric circuit, such as an outer conductor, and on the other side is connected in series to a dipole formed by the energy storage circuit and whose second pole is also connected to a conductor of the main electric circuit, such as the neutral conductor. During operation at normal rating only minimal current flows through the varistor, which influences only slightly the energy storage circuit by means of an appropriate potentiometer and loads the storage capacitor to a small fraction of its voltage, required for conducting the voltage-dependent switch element of the energy storage circuit. This produces a type of energy pre-storage which can also be used to alter the trigger characteristic of the FC switch within predetermined limits. This grid potential is also favourable, since the electronics of the energy storage circuit work under optimum conditions (favourable operating characteristics for the rectifier circuit and the storage condenser), which in terms of life expectancy can be allowed as 'dormant mode failure rate' conditions. This is state-of-the-art, as in AT-B-197 468 and AT-B-205 574.

There are two variants to select from when the varistors are switched according to the present invention. The energy storage circuit is switched as a dipole such that the connections of the varistor circuit are switched in parallel to the connections of the secondary coil of the summary current transformer. The varistor current then is effective as an alternating current, just like the secondary current of the summary current transformer A disadvantage of this circuit is the opposing influence of secondary current and varistor current which can however be controlled by corresponding dimensioning.

With the second solution, another rectifier is switched into the varistor circuit and in the energy storage circuit both connections of the storage condenser serve as dipole. Here also, as explained above, with operation at normal rating, the storage condenser is loaded to minimum grid potential and therefore functions under optimum operating conditions. It is understood that in accordance with technical regulations further series resistors or parallel resistors or components for high-voltage protection can be inserted into the varistor circuit for dimensioning. The energy storage circuit also offers the advantage, whereby the varistor needs to be dimensioned only for low operating currents.

The fault current triggering works voltage-independently by means of the energy storage circuit, and only the temperature monitoring of the FC switch depends functionally on the mains supply.

DETAILED DESCRIPTION OF THE INVENTION

The invention is described in greater detail hereinafter with reference to the embodiments represented in FIGS. 1 to 10.

Figure 1:
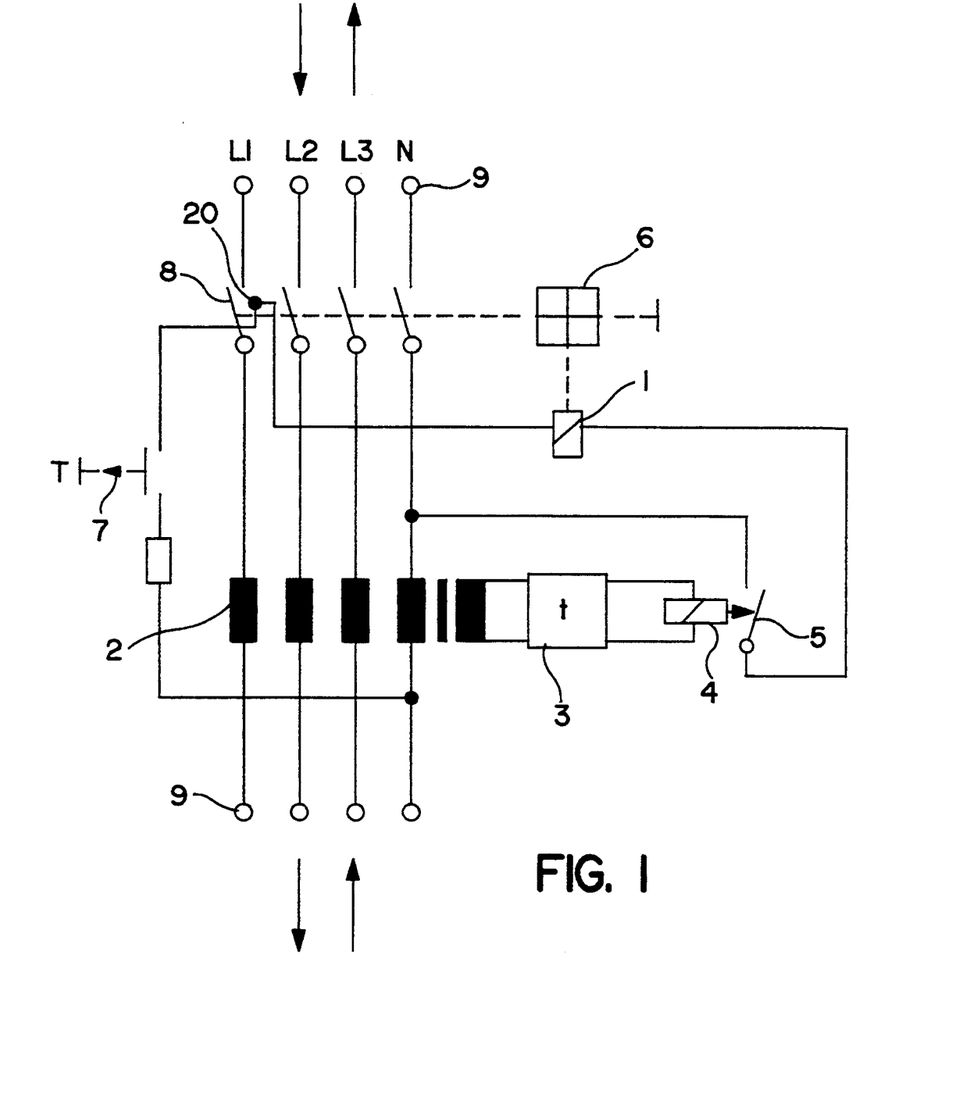
FIG. 1 shows an embodiment of a ground fault circuit interrupter according to the present invention equipped with a monostable transformer relay having a coil.

FIG. 1 shows a FC switch according to the present invention which works with a monostable transformer relay with coil 4. The secondary winding of the summary current transformer 2 is connected by means of a voltage-independent energy storage circuit 3 to the coil of monostable transformer relay 4. Should the fault current in the primary winding of summary current transformer 2 exceed a predetermined value, the energy storage circuit then gives a sufficiently long actuating impulse to transformer relay 4 whereby relay contact 5 is made for sufficiently long for lock trigger 1 to actuate switch lock 6 when the switch is switched on. This effectively opens switch contacts 8 and breaker contact 20. After this the monostable transformer relay returns to its starting position, opening relay contact 5 and the FC switch can be switched on again by hand.

Figure 2:
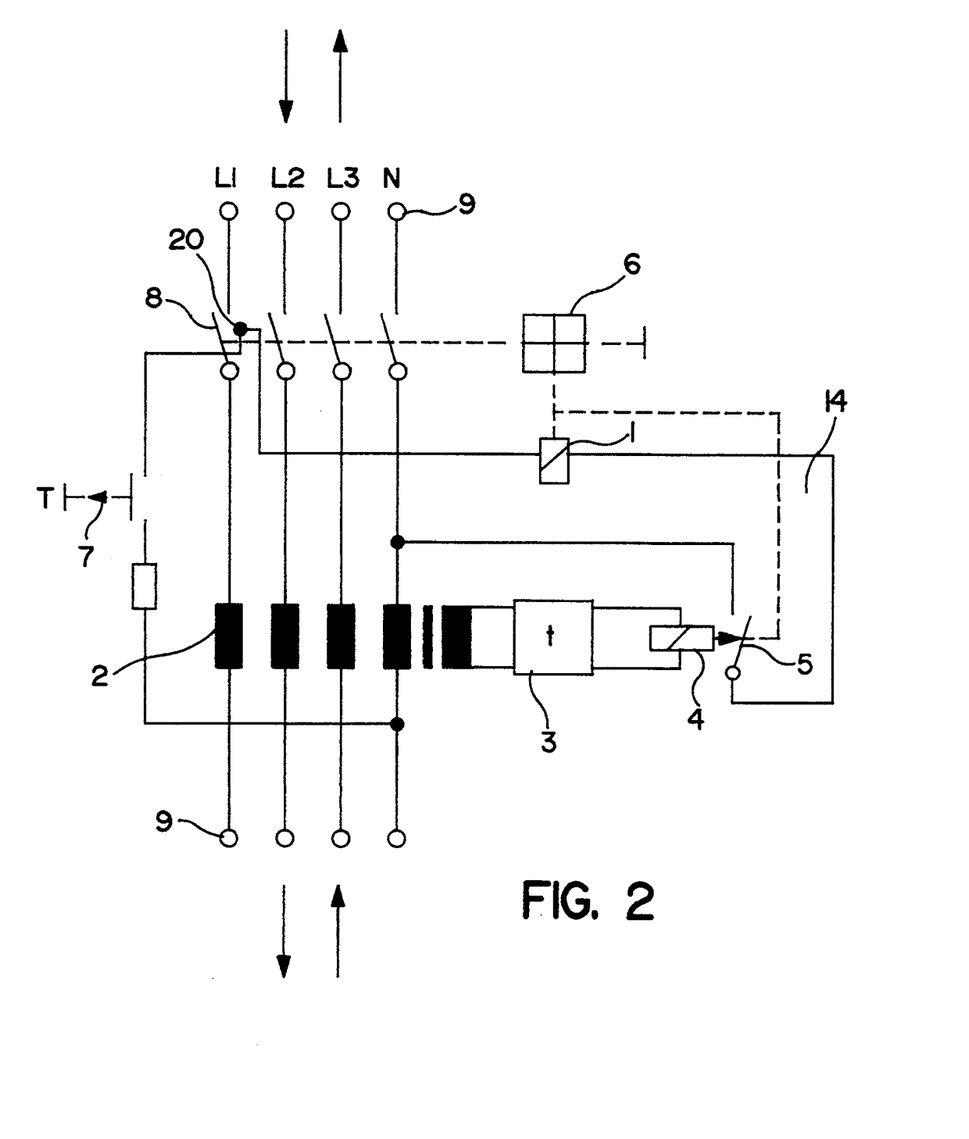
FIG. 2 shows an embodiment of a ground fault circuit interrupter according to the present invention equipped with a bistable transformer relay having a coil.
Figure 5:
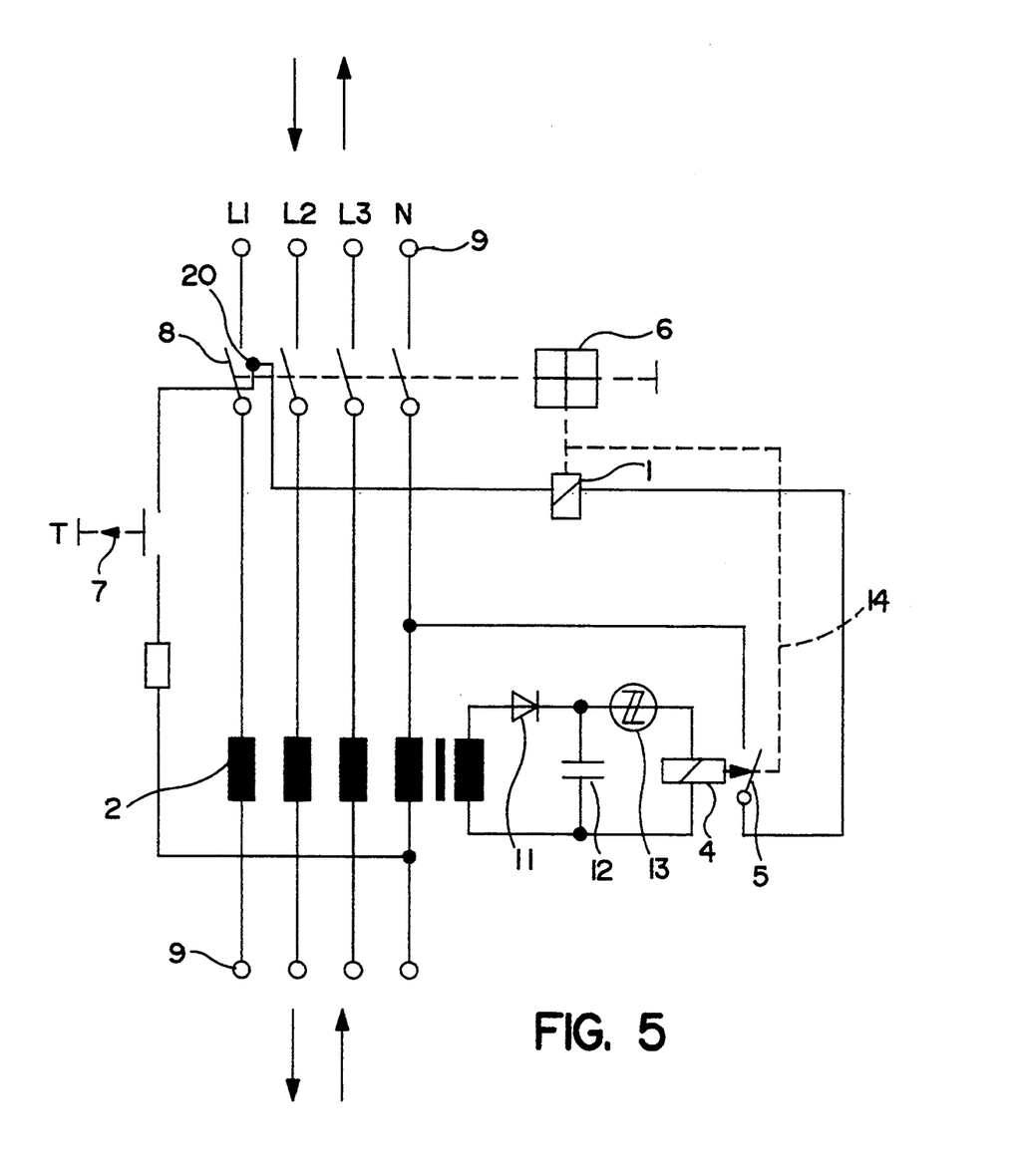
FIG. 5 shows a circuit for voltage independent energy storage of a ground fault circuit interrupter according to the present invention.

The connection of the supply mains occurs independently of the mains side and user side, as is the case in the solutions represented in FIGS. 2 and 5.

The FC switches according to the present invention may also be equipped with usual test devices 7.

FIG. 2 shows a FC switch according to the present invention which works with a bistable transformer relay with coil 4. The secondary winding of summary current transformer 2 is again connected to the coil of bistable transformer relay 4 by means of a voltage-independent energy storage circuit 3. Should the fault current in the primary winding of summary current transformer 2 exceed a predetermined value, the energy storage circuit then gives an actuation impulse to transformer relay 4, whereby relay contact 5 is made and then remains in this position. This causes lock trigger 1 to be actuated by the energizing current coming from the mains, when the switch is switched on, and switch lock 6 to be switched off. This effectively opens switch contacts 8 and breaker contact 20. During the switching off procedure bistable transformer relay 4 is returned to its starting position from switch lock 1 by means of a mechanical coupling 14 and the FC switch can De switched on again manually.

Figure 3:
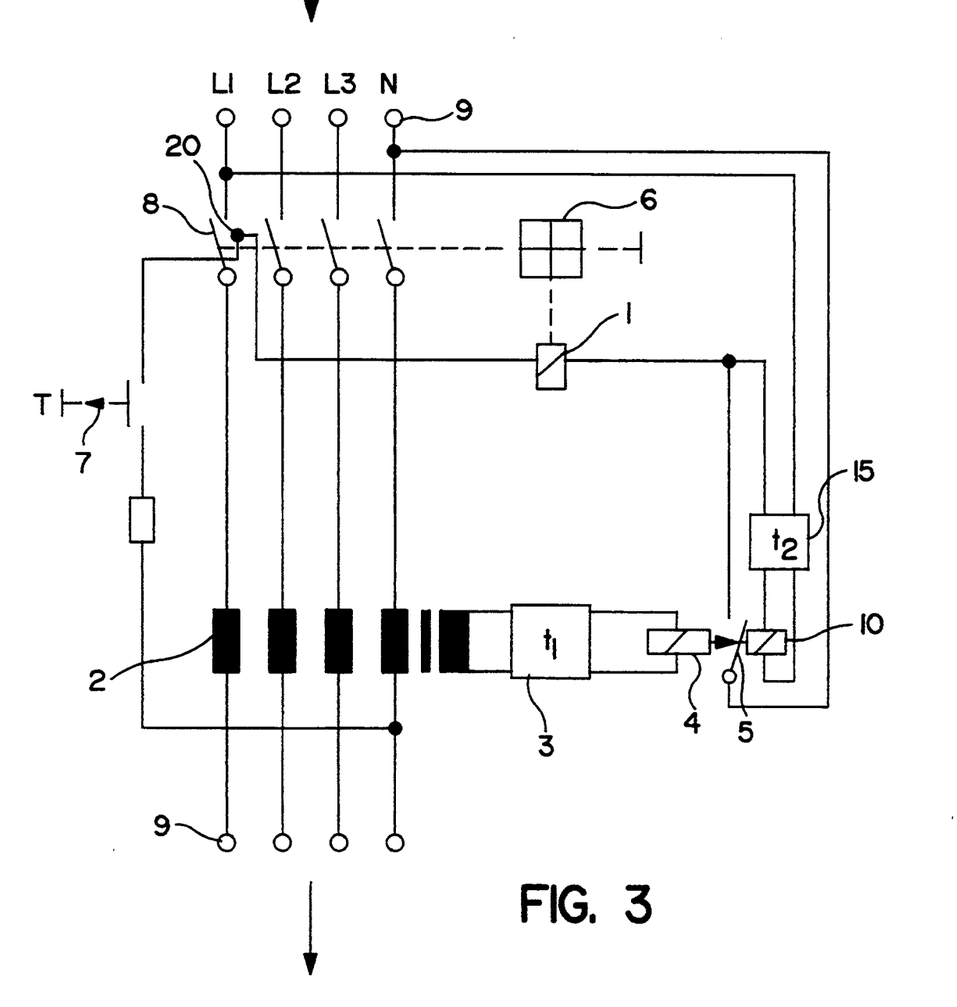
FIG. 3 shows another embodiment of a ground fault circuit interrupter according to the present invention equipped with a bistable transformer relay having a coil.

FIG. 3 shows a FC switch according to the present invention which also works with a bistable transformer relay with coil 4. The secondary winding of summary current transformer 2 is again connected to the coil of bistable transformer relay 4 by means of a voltage-independent energy storage circuit 3 and the function during release is the same as described in FIG. 2. Resetting of bistable transformer relay 4 is however performed electrically by means of an appropriate time delay circuit 15 which works voltage-independently and by means of which relay contact 5 is returned to its starting position by way of reset coil 10.

Figure 4:
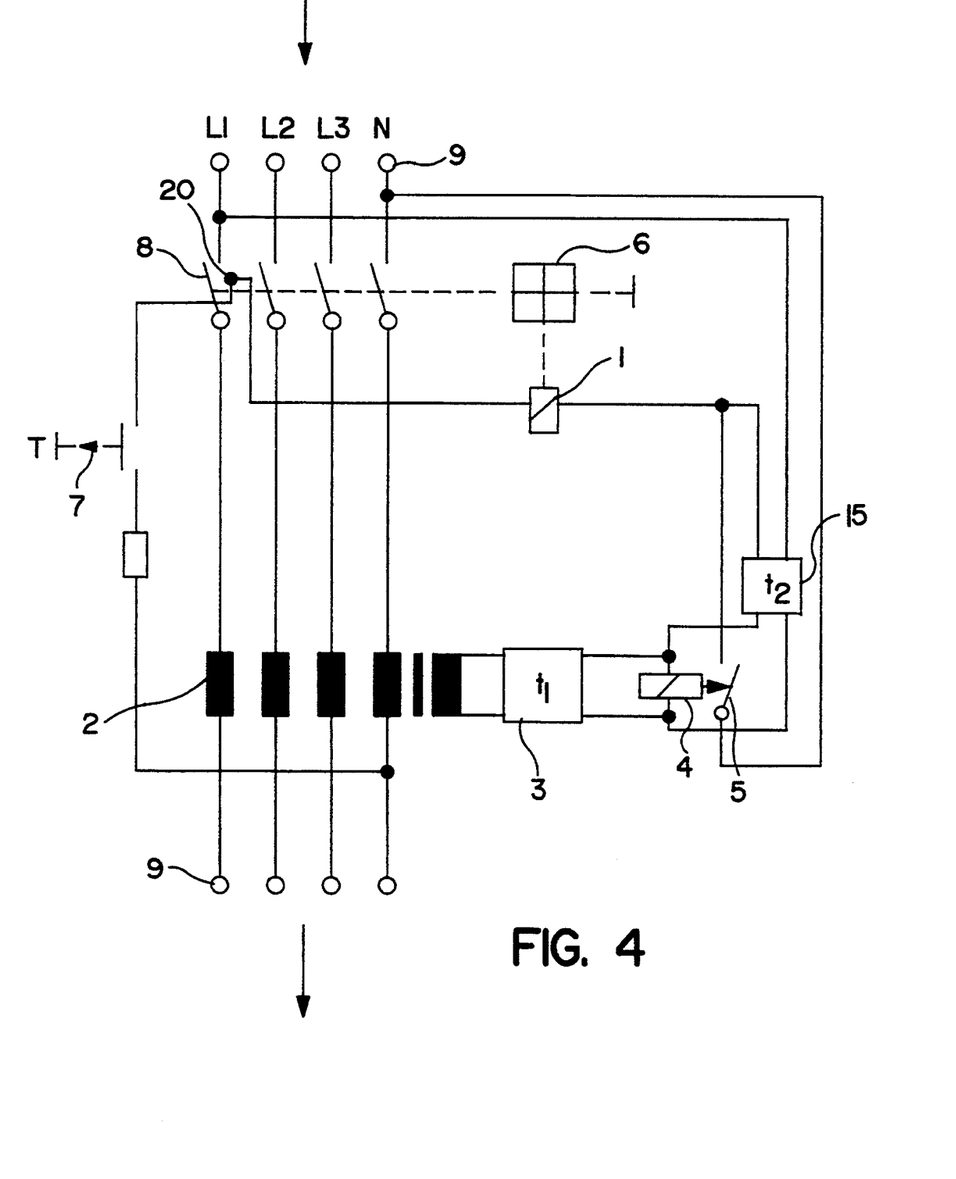
FIG. 4 shows yet another embodiment of a ground fault circuit interrupter according to the present invention equipped with a bistable transformer relay having a coil.

FIG. 4 shows a FC switch according to the present invention which also works with a bistable transformer relay with coil 4. The function is the same as in FC switches described in FIGS. 2 and 3. The only difference is that bistable transformer relay 4 has only one relay spool which is both used for triggering the FC switch by means of switch lock trigger I and for serving to reset relay contact 5. Resetting recurs by means of an appropriate time delay circuit 15 which works voltage-independently and which is connected to mains supplies on the mains side.

With the switching in FIGS. 3 and 4, the mains side and the user side must be taken into account when the FC switch is connected.

FIG. 5 shows by way of example a circuit for voltage-independent energy storage circuit 3, consisting of a rectifier circuit 11 which charges a storage condenser 12 when the fault current flows in summary current transformer 2. After a certain charge voltage is reached, and thus also the charge energy required to actuate transformer relay 4, a semiconductor element 13 becomes conductive and the charge energy is discharged by way of the coil of transformer relay 4, whereby relay contact 5 is closed and thus the lock trigger receives its energizing current from the mains supply. The transformer relay is effectively mechanically reset by the switching off motion of switch lock 6, whereby relay contact opens and moreover the circuit for the lock trigger and the test circuit are broken by breaker contact 20. Connection of the FC switch is also independent of the mains and user sides.

Figure 6:
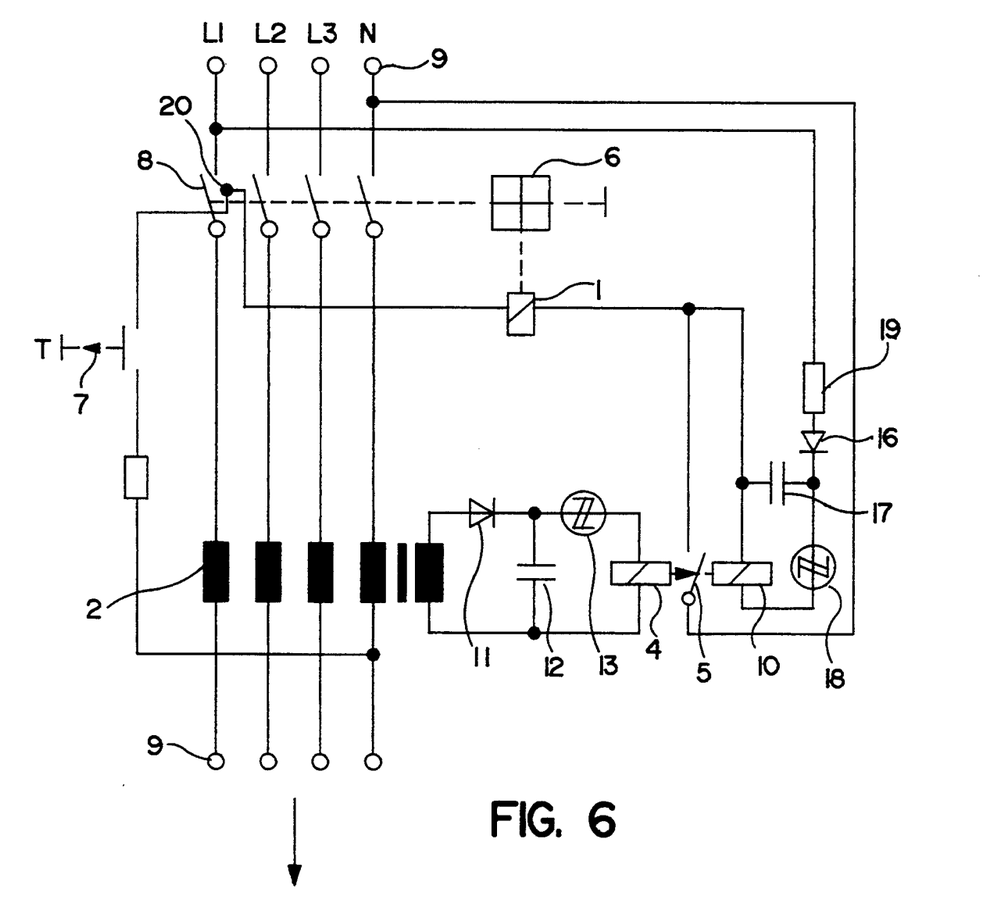
FIG. 6 shows a time delay circuit for electrical resetting of a bistable transformer relay of a ground fault circuit interrupter according to the present invention.

FIG. 6 shows by way of example a time delay circuit for the electrical resetting of the bistable transformer relay. After the FC switch is triggered, as described in FIGS. 2 and 3, the charging of a voltage-independent energy storage circuit begins (not to be confused with the voltage-independent energy storage circuit connected to the transformer relay), simultaneously with triggering of the FC switch by lock trigger 1 by means of a special circuit connected to the mains supply on the mains side before breaker contacts 8 and by way of relay contact 5. Charging of charging condenser 17 occurs by means of charging resistor 19 and a rectifier circuit 16. After accumulation of the charge energy required to actuate reset coil 10 of transformer relay 4, semiconductor element 18 becomes conductive and resetting occurs by impulse by means of reset coil 10. When a FC switch of this design is connected, mains and user sides must be taken into account, although breaker contact 20 breaks the circuit for the lock trigger and the test circuit.

Figure 7:
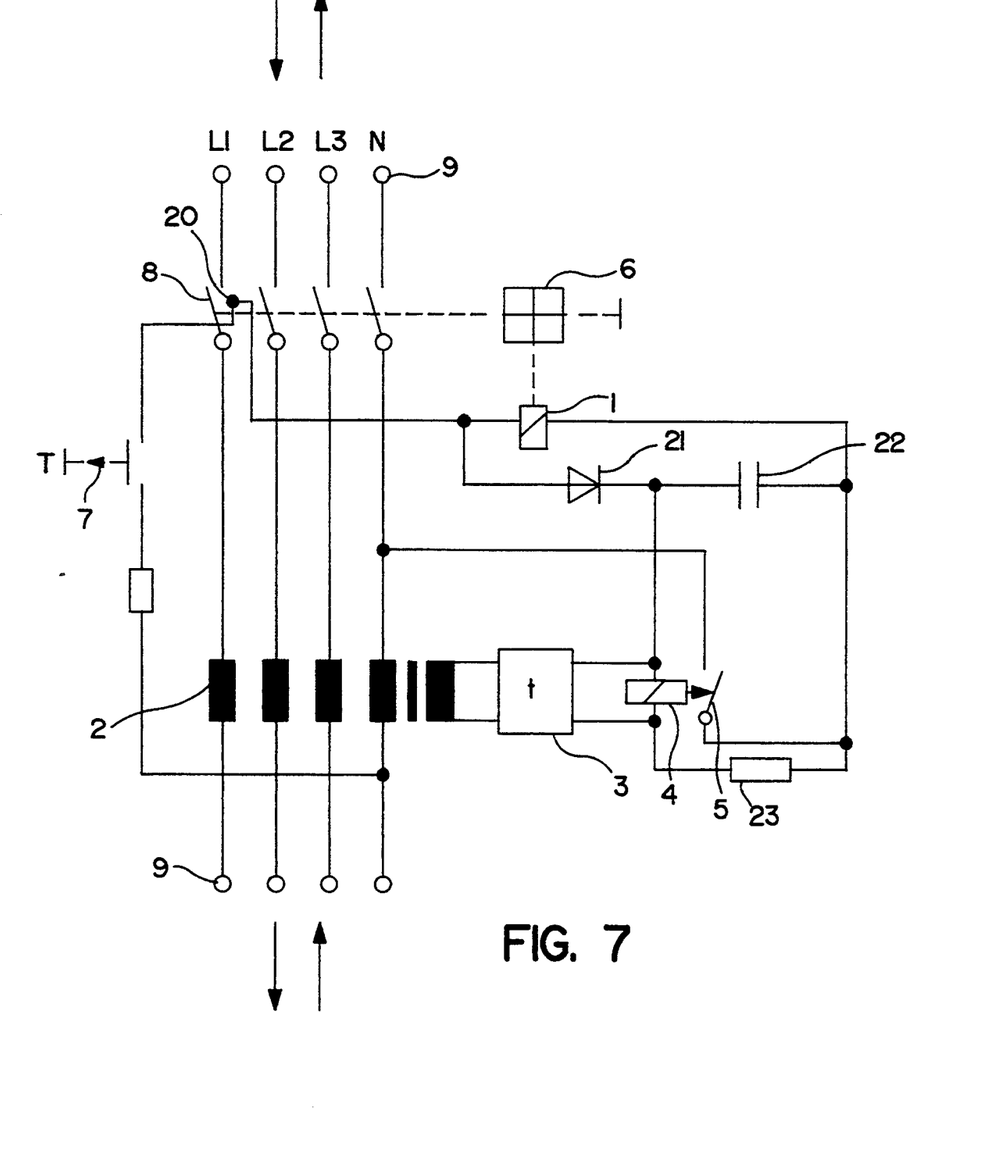
FIG. 7 shows an embodiment of a ground fault circuit interrupter according to the present invention equipped with a monostable relay.

FIG. 7 shows a switch according to the present invention which works with a monostable relay 4. The secondary winding of summary current transformer 2 is connected to monostable transformer relay 4 by means of a voltage-independent energy storage circuit 3. Should the fault current in the primary winding of summary current transformer 2 exceed a pre-determined value, the energy storage circuit gives an actuation impulse to transformer relay 4, whereby relay contact 5 is closed. At the same time the mains current begins to flow through relay coil 4 by way of rectifier 21 and current limiting resistor 23 and thereby keeps monostable relay 4 in alignment. Condenser 22 is effective as a smoothing condenser. Switch lock 6 is actuated by the current flow from the mains by way of the operating trigger and closed relay contact 5, and contact apparatus 8 is opened with auxiliary contact 20. The holding circuit is also broken and the monostable electromechanical relay returns to its starting position.

Figure 8:
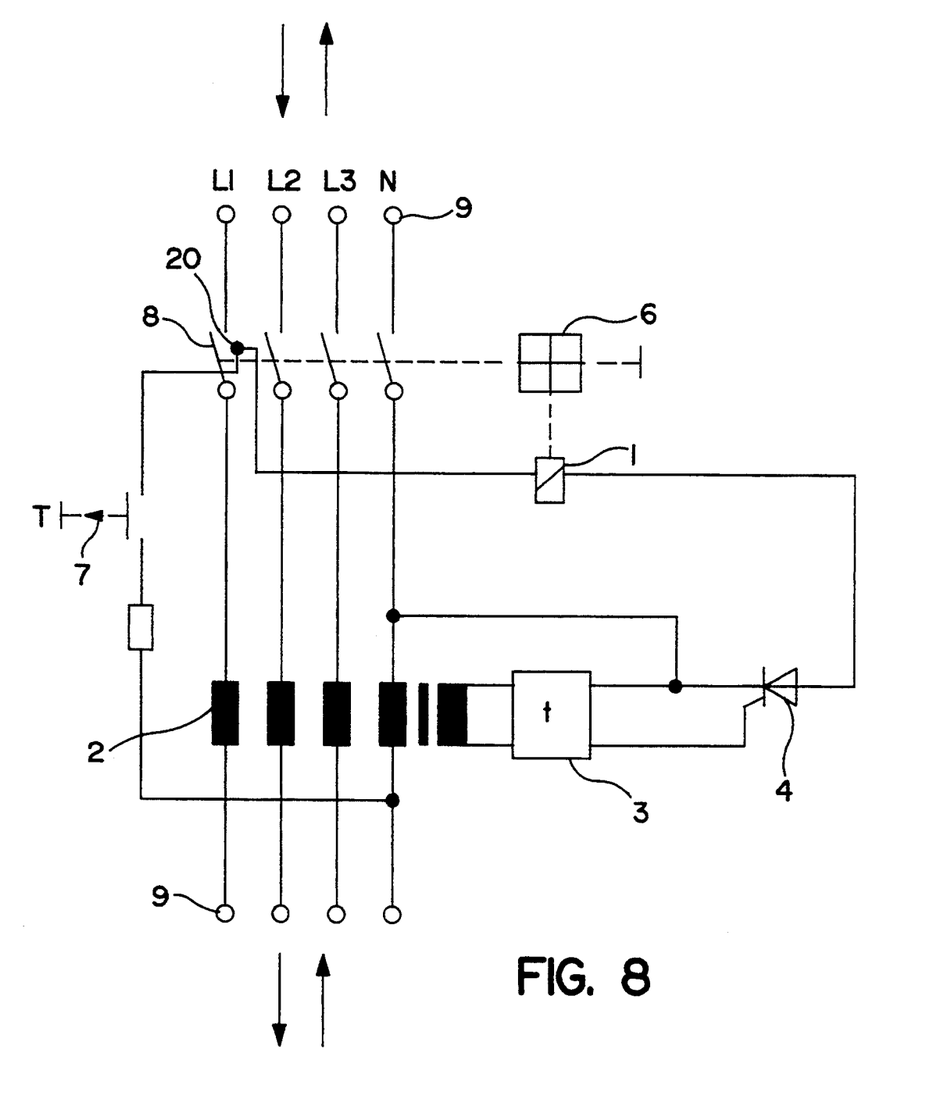
FIG. 8 shows an embodiment of a ground fault circuit interrupter according to the present invention equipped with a thyristor as the transformer relay.

FIG. 8 shows a switch according to the present invention which works with a thyristor as transformer relay 4. The secondary coil of summary current transformer 2 is connected to the input terminal of thyristor circuit 4 by means of a voltage-independent energy storage circuit 3.

Should the fault current in the primary winding of summary current transformer 2 exceed a pre-determined value, the thyristor becomes conductive, thereby actuating switch lock 1. After the FC switch is switched off, thyristor 4 returns to its non-conducting state.

Figure 9:
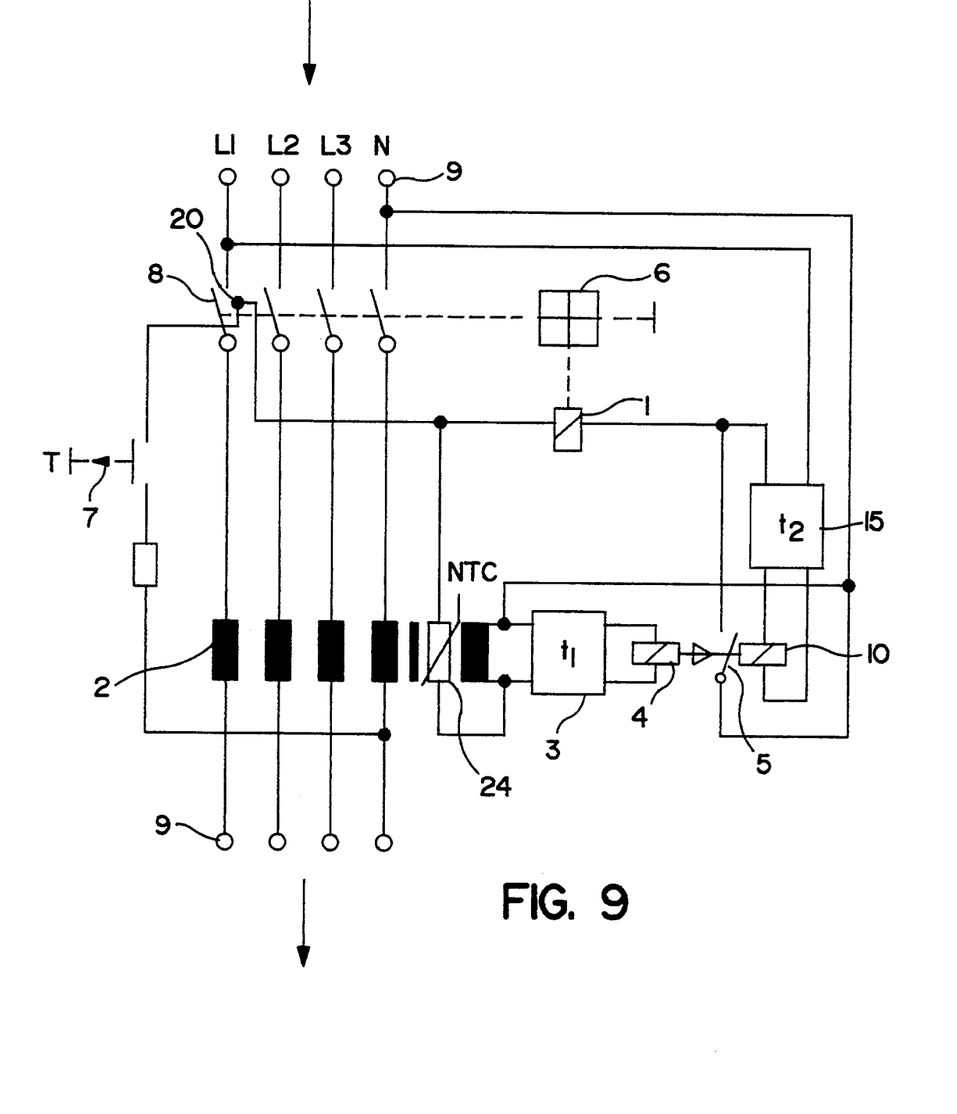
FIG. 9 shows an embodiment of a ground fault circuit interrupter according to the present invention equipped with an overload protection circuit.

FIG. 9 shows a switch according to the present invention with overload protection by means of a varistor 24 in summary current transformer 2 which is connected to an outer conductor L1 when the switch is in the switched on position. The other end of the varistor is connected to one terminal of the input of the circuit of energy storage circuit 3, to which one end also of the secondary winding of the summary current transformer is connected. The other terminal of the input of the circuit of the energy storage circuit, to which the other end of the secondary winding of the summary current transformer is connected, is connected to the neutral conductor N.

Figure 10:
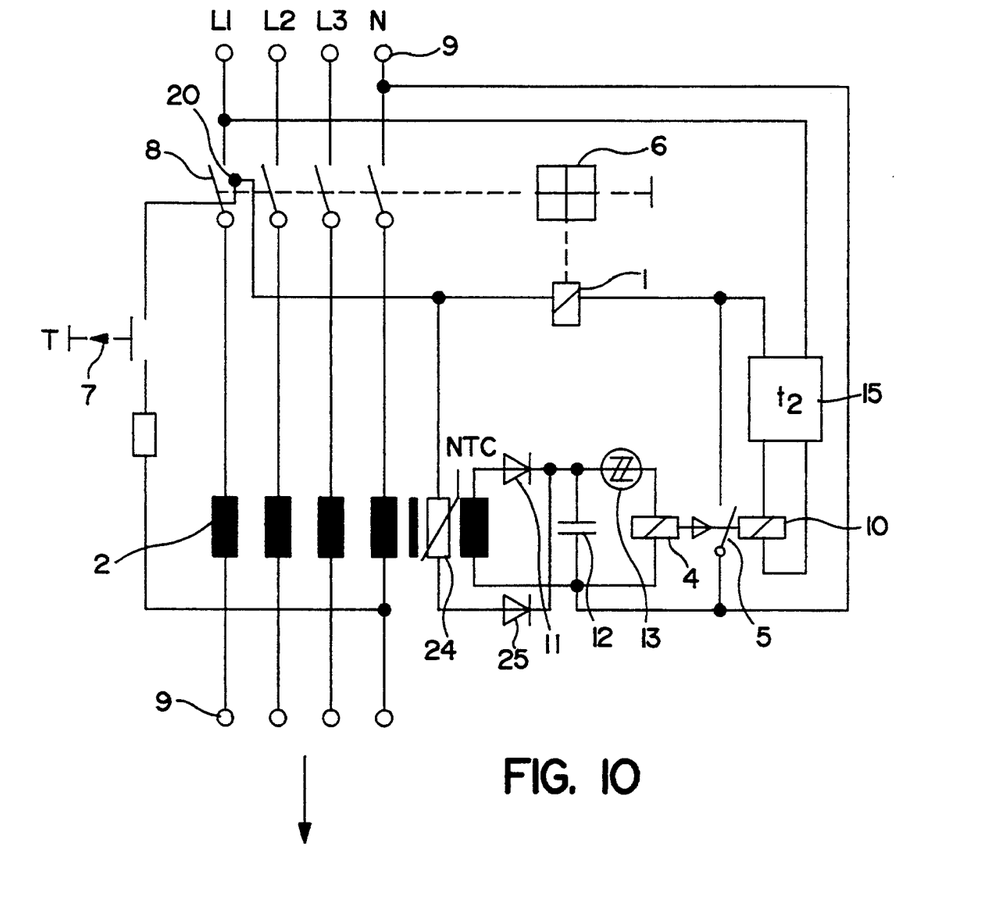
FIG. 10 shows another embodiment of a ground fault circuit interrupter according to the present invention equipped with an overload protection circuit.

FIG. 10 shows a switch according to the present invention with overload protection by means of a varistor 24 in summary current transformer 2 which is connected to an outer conductor L1 when the switch is in the switched on position. The other end of the varistor is connected to a connection of storage condenser 12 by means of a rectifier 25, the other end of which is connected to the neutral conductor N.

I claim:

1. A ground fault circuit interrupter comprising terminals for line supply voltage, switching means having switch contacts (8) connected to a switch lock to make and break contact with said line supply, an electromagnetic current lock trigger to trigger said switch lock, a summary transformer having a primary and a secondary winding, said primary winding being connected to said switch contacts (8), said secondary winding being connected to an electronic energy storage circuit which is connected to a transformer relay having a contact maker, said secondary winding supplying energy to said electronic storage circuit (3) which discharges and actuates said transformer relay (4) when a preset trigger fault current limit is exceeded, and a ground fault circuit interrupter test device (7) having a first and a second terminal, said first terminal being switchingly connected to one phase of said line supply voltage and said second terminal being connected to a neutral phase of said line supply voltage across said primary winding of said summary current transformer, wherein said electronic storage circuit is a line supply voltage-independent electronic energy storage circuit, and said transformer relay actuates said current lock trigger to trigger said switch lock (6) by closing said contact maker on a relay contact (5) connected to said electromagnetic current lock trigger (1) in a voltage-dependent manner, whereupon said ground fault circuit interrupter switches off and said transformer relay (4) returns to a position held prior to actuation of said current lock trigger (1).

2. A ground fault circuit interrupter as claimed in claim 1, wherein said transformer relay (4) comprises a coil and is a monostable electromechanical relay which closes said relay contact (5) momentarily by means of an electrical impulse from said electronic energy storage unit (3), and wherein said electrical impulse from said electronic energy storage circuit is of a sufficient width to energize the coil of said transformer relay to close said contact maker on said relay contact (5) for a sufficient duration of time to allow said current lock trigger (1) to safely actuate said switch lock (6).

3. A ground fault circuit interrupter as claimed in claim 1, wherein said transformer relay is a monostable electromechanical transformer relay (4) which is kept in a switched on position after actuation by means of said voltage-independent electronic energy storage circuit (3) by maintaining said relay contact (5) closed on said contact maker by means of an electrical maintenance circuit (21, 22, 23) for a sufficiently long period of time to allow for said switch contacts (8) to have switched off with an auxiliary contact (20).

4. A ground fault circuit interrupter as claimed in claim 1, wherein said transformer relay (4) comprises a coil and is configured as a bistable electromechanical relay which switches on by closing said relay contact (5) and actuates said current lock trigger (1) to trigger said switch lock (6), and switches off by resetting said transformer relay (4) to said position held prior to actuation of said lock trigger (1) by means of a mechanical coupling (14) coupled with said switch lock (6).

5. A ground fault circuit interrupter as claimed in claim 1, wherein said transformer relay (4) comprises a coil and is configured as a bistable electromechanical relay which switches on by closing said relay contact (5) and actuates said current lock trigger (1) to trigger said switch lock (6), and switches off by electrically resetting said transformer relay by means of an additional reset coil (10) acting on said relay contact (5) of the transformer relay (4), said reset coil (10) being connected to said line supply voltage via an electrical time delay circuit (15).

6. A ground fault circuit interrupter as claimed in claim 1, wherein said transformer relay (4) comprises a coil and is configured as a bistable electromechanical relay which switches on by closing said relay contact (5) and actuates said current lock trigger (1) to trigger said switch lock (6), and switches off by resetting said transformer relay (4) by means of a single coil connected to said electronic storage circuit (3) as well as to said line supply voltage via an electrical time delay circuit (15), said single coil being said coil of said transformer relay (4).

7. A ground fault circuit interrupter as claimed in claim 1, wherein said voltage-independent electronic storage circuit comprises a rectifier circuit (11), a storage condenser (12), and a voltage-dependent electronic switching element (13).

8. A ground fault circuit interrupter as claimed in claim 5, wherein said time delay circuit (15) comprises a rectifier circuit (16), a storage condenser (17), and a voltage-dependent electronic switching element (13), and is supplied voltage-dependently through a charging resistor (19).

9. A ground fault circuit interrupter as claimed in claim 1, wherein said transformer relay (4) is configured as an electronic relay which becomes conductive by means of an impulse from a discharge of said voltage-independent electronic energy storage circuit (3) whenever a fault current in said primary winding of said summary current transformer (2) exceeds a predetermined value.

10. A ground fault circuit interrupter as claimed in claim 1, wherein a negative temperature coefficient resistor (24) is built into said summary transformer (2) by means of auxiliary circuit leads which connect one terminal of said negative temperature coefficient resistor (24) to said line supply voltage and another terminal to an input terminal of said electronic energy storage circuit (3), thereby switching said ground fault circuit interrupter off when a temperature in said summary transformer (2) exceeds a permissible excess temperature of said electronic energy storage circuit (3).

11. A ground fault circuit interrupter as claimed in claim 10, wherein said negative temperature coefficient resistor (24) is connected to said electronic energy storage circuit (3) in parallel to said secondary winding of said summary current transformer (2).

12. A ground fault circuit interrupter as claimed in claim 10, wherein said negative temperature coefficient resistor (24) is connected in parallel to a storage condenser (12) through a rectifier circuit (25), said storage condenser being connected across said transformer relay (4).

13. A ground fault circuit interrupter as claimed in claim 9 wherein said transformer relay (4) is a thyristor circuit.

* * * * *